(No Model.) 2 Sheets—Sheet 1.

R. BAGALEY.
PIPE COUPLING.

No. 332,035. Patented Dec. 8, 1885.

WITNESSES:
Snowden Bell.
C. M. Clarke

INVENTOR.
Ralph Bagaley,
BY George H. Christy
ATTORNEY.

(No Model.) 2 Sheets—Sheet 2.

R. BAGALEY.

PIPE COUPLING.

No. 332,035. Patented Dec. 8, 1885.

WITNESSES:

INVENTOR.
Ralph Bagaley,
BY George H. Christy
ATTORNEY.

N. PETERS, Photo-Lithographer, Washington, D. C.

UNITED STATES PATENT OFFICE.

RALPH BAGALEY, OF PITTSBURG, PENNSYLVANIA, ASSIGNOR OF ONE-HALF TO WILLIAM A. BOLE, OF SAME PLACE.

PIPE-COUPLING.

SPECIFICATION forming part of Letters Patent No. 332,035, dated December 8, 1885.

Application filed January 27, 1885. Serial No. 154,111. (No model.)

*To all whom it may concern:*

Be it known that I, RALPH BAGALEY, a citizen of the United States, residing at Pittsburg, in the county of Allegheny and State of Pennsylvania, have invented or discovered certain new and useful Improvements in Pipe-Couplings, of which improvements the following is a specification.

Figure 1:
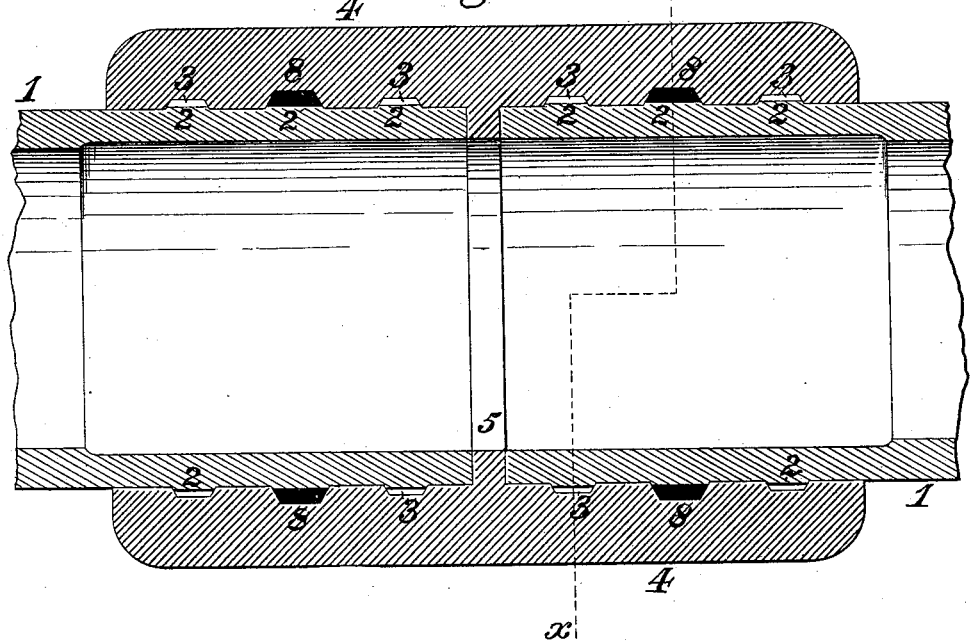
Figure 2:
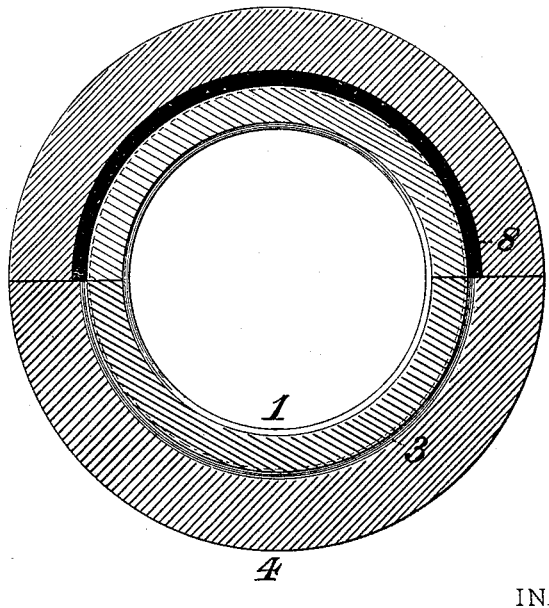

In the accompanying drawings, which make part of this specification, Figure 1, Sheet 1, is a longitudinal central section through a pipe-coupling embodying my invention; Fig. 2, a transverse section through the same at the line $x$ $x$ of Fig. 1; and Figs. 3 and 4, Sheet 2, longitudinal central half-sections through couplings, illustrating modifications.

The object of my invention is to provide a coupling for metal pipes or tubes which shall be of simple and inexpensive construction, and by which the sections of a line or main may be securely connected, and leakage or displacement of the joints be effectually prevented.

The improvements claimed are hereinafter fully set forth.

In the practice of my invention I connect two adjacent lengths or sections, 1, of a line or main of tubes or pipes by a substantial metallic coupling-socket, 4, having a cylindrical bore or axial opening, the diameter of which is sufficient to freely admit the pipes which are to be coupled, the socket being provided with a central internal flange or rib, 5, which serves as a stop and gage for insuring the insertion of each tube for a proper distance in the socket. A series of circumferential recesses, 3, is formed in the bore of the socket 4, on each side of the central rib, 5, each of said recesses being adapted to engage a circumferential swell, bead, or collar, 2, on the adjacent pipe-section, the metal of which is forced tightly against the bore of the socket and projected into the recesses 3 by being expanded through the application of internal pressure applied by a suitable expanding-tool.

Figure 3:
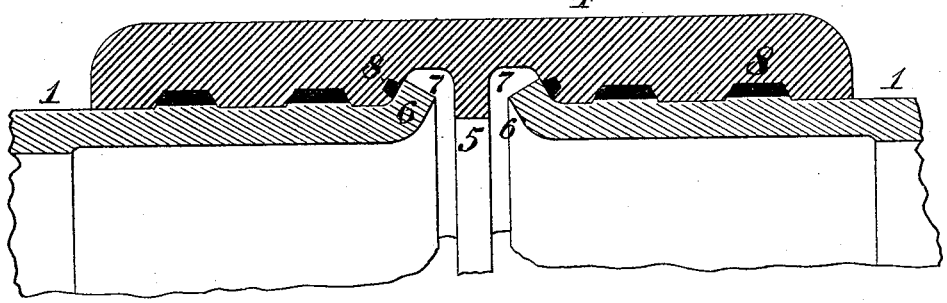
Figure 4:
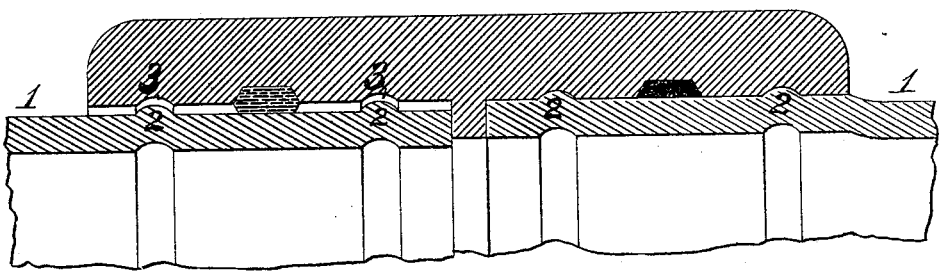

In the couplings shown in Figs. 1 to 3 the pipe-sections are, prior to being connected, of plain cylindrical form, and the swells or beads 2 are formed thereon in and by the operation of expanding them into the socket, while in the construction shown in Fig. 4 they are rolled preliminarily upon the pipe-sections, the bores of the sockets being of sufficient diameter to admit them, as shown on the left side of Fig. 4, and are caused to engage the recesses of the sockets by being expanded coincidently with the portions of the pipe-sections which fit therein.

In order to obtain as large a projection as possible of metal beyond the peripheries of the pipe-sections, end swells, 6, of tapering or conical form, may be formed thereon by expanding the ends of the sections 1 into recesses 7 adjacent to the central rib, 5, said recesses having their forward sides tapered or inclined from the bore of the socket toward the rib 5, as shown in Fig. 3.

Packing-rings 8, of rubber, metal, or other suitable material, inserted in one or more of the coupling-recesses on each side of the central rib, 5, enhance the tightness of the joint by being compressed within the recesses by the expansion of the pipe-sections thereinto.

I am aware that a pipe-coupling having an internally-recessed coupling-socket, into which the material of the pipes is forced by expanding-rollers, was known prior to my invention, and such, therefore, broadly I distinctly disclaim.

I claim herein as my invention—

1. In a pipe-coupling, the combination of a coupling-socket having a circumferentially-recessed bore, a pipe fitting in said socket engaging the recesses thereof by peripheral enlargements, and a packing-ring inserted in a recess of the bore of the socket and compressed therein between the same and a collar of the pipe, substantially as set forth.

2. In a pipe-coupling, the combination of a coupling-socket having tapered circumferential recesses adjacent to the middle of its bore, and a pair of pipes fitting in said bore and engaging the recesses by tapered or conical enlargements upon the ends of the pipes, substantially as set forth.

In testimony whereof I have hereunto set my hand.

RALPH BAGALEY.

Witnesses:
J. SNOWDEN BELL,
R. H. WHITTLESEY.